US012593018B2

(12) United States Patent (10) Patent No.: US 12,593,018 B2
Ryu et al. (45) Date of Patent: Mar. 31, 2026

(54) SYSTEM AND METHOD FOR CONTROLLING PERCEPTUAL THREE-DIMENSIONAL ELEMENTS FOR DISPLAY

(71) Applicant: Faurecia IRYStec Inc., Montreal (CA)

(72) Inventors: Seungchul Ryu, Greenfield Park (CA); Hyunjin Yoo, North Lancaster (CA); Tara Akhavan, Kirkland (CA); Edouard Da Silva, Herblay (FR)

(73) Assignee: Faurecia IRYStec, Inc., Montreal (CA)

( * ) Notice: Subject to any disclaimer, the term of this patent is extended or adjusted under 35 U.S.C. 154(b) by 98 days.

(21) Appl. No.: 17/727,433

(22) Filed: Apr. 22, 2022

(65) Prior Publication Data
US 2023/0344975 A1     Oct. 26, 2023

(51) Int. Cl.
| | |
|---|---|
| *B60K 35/10* | (2024.01) |
| *B60K 35/22* | (2024.01) |
| *B60K 35/50* | (2024.01) |
| *B60K 35/60* | (2024.01) |
| *B60K 35/81* | (2024.01) |
| *G06T 11/00* | (2006.01) |
| *H04N 13/128* | (2018.01) |

(52) U.S. Cl.
CPC ........... *H04N 13/128* (2018.05); *B60K 35/10* (2024.01); *B60K 35/22* (2024.01); *B60K 35/50* (2024.01); *B60K 35/60* (2024.01); *B60K 35/81* (2024.01); *G06T 11/001* (2013.01); *B60K 2360/133* (2024.01); *B60K 2360/1464* (2024.01)

(58) Field of Classification Search
None
See application file for complete search history.

(56) References Cited

U.S. PATENT DOCUMENTS

| | | |
|---|---|---|
| 11,082,678 B2 | 8/2021 | Pflug |
| 2012/0019528 A1 | 1/2012 | Ugawa |
| (Continued) | | |

FOREIGN PATENT DOCUMENTS

| | | |
|---|---|---|
| CN | 109040739 A | 12/2018 |
| EP | 1463014 A2 | 9/2004 |
| (Continued) | | |

OTHER PUBLICATIONS

C. Fehn et al., "Interactive 3-DTV-concepts and key technologies," Proceedings of the IEEE, 2006, 15 pages.
(Continued)

*Primary Examiner* — Samuel D Fereja
(74) *Attorney, Agent, or Firm* — Reising Ethington P.C.

(57) ABSTRACT

An image processing system and method is provided for controlling an amount of perceptual three-dimensional elements for a display. The method includes: receiving an input image; receiving user information concerning a user; adjusting an amount of perceptual three-dimensional elements within the input image to obtain an adjusted input image based on depth information of the input image and the user information; and displaying the input image as adjusted on a display. The user information may include user profile information and/or a predetermined perceptual 3D control input. The image processing system and method may be used to tune the amount of perceptual three-dimensional elements within the input image according to the user.

17 Claims, 8 Drawing Sheets

(56) References Cited

U.S. PATENT DOCUMENTS

| | | | |
|---|---|---|---|
| 2012/0084652 A1 | 4/2012 | Martinez Bauza | |
| 2015/0304625 A1 | 10/2015 | Seto et al. | |
| 2017/0293356 A1* | 10/2017 | Khaderi | G02B 27/0172 |
| 2018/0263485 A1* | 9/2018 | Takahashi | G06T 7/0012 |
| 2019/0035165 A1* | 1/2019 | Gausebeck | G06T 17/00 |
| 2022/0051485 A1* | 2/2022 | Martin Brualla | G06T 15/20 |
| 2023/0027251 A1* | 1/2023 | Valli | H04N 13/167 |

FOREIGN PATENT DOCUMENTS

| | | |
|---|---|---|
| KR | 101704242 B1 | 2/2017 |
| WO | 2012047917 A1 | 4/2012 |

OTHER PUBLICATIONS

J. Jung et al., "Improved Depth Perception of Single-View Images," ICTI TEEEC, 2010, 9 pages.

H. Hel-Or et al., "Depth-Stretch: Enhancing Depth Perception Without Depth," IEEE CVPRW, 2017, 9 pages.

Extended European Search Report corresponding to application 23167516.6, dated Aug. 22, 2023, 16 pages.

* cited by examiner

10

1

SYSTEM AND METHOD FOR CONTROLLING PERCEPTUAL THREE-DIMENSIONAL ELEMENTS FOR DISPLAY

TECHNICAL FIELD

This invention relates to methods and systems for presenting perceptual three-dimensional elements on an electronic display, such as monocular depth cues or other visually-perceptible cues indicative of depth range and/or depth volume.

BACKGROUND

Depth perception is the visual ability for a stereoscopic system, such as humans, to perceive the world in three dimensions, namely perceiving the distance between objects. However, traditional display technologies are only able to display images with limited depth perception. In order to overcome this limitation, in recent decades, many methods and devices have been developed to provide enhanced depth perception. Due to the significant advantages of allowing the perception of more realistic image contents, depth perception enhancement has attracted much attention in display and image processing applications. C. Fehn et al., "Interactive 3-DTV-concepts and key technologies," Proceedings of the IEEE, 2006.

Depth impression or perception may be derived based on two cues: binocular and monocular depth cues. The majority of researches were focused on the binocular depth cue to provide depth perception due to its extreme effects. However, users should be equipped with expensive special devices such as stereoscopic display devices to appreciate depth perception based on the binocular depth cues. Also, visual fatigue induced by the stereoscopic display is still a challenging open problem. Thus, several works (including J. Jung et al., "Improved depth perception of single-view images," ICTI TEEEC, 2010; and H. Hel-Or et al., "Depth-Stretch: Enhancing Depth Perception Without Depth," IEEE CVPRW, 2017) studied to enhance monocular depth cues as an alternative approach, which does not require any specialized three-dimensional (3D) display and does not induce visual fatigue. The monocular depth cues help the observer perceive depth when viewing a two-dimensional (2D) image, including linear perspective, occlusion, aerial perspective, contrast, motion parallax, and shading cues. Depth perception cues determine the following two types of perception: depth volume perception and depth range perception. Depth volume perception refers to the perceived volume of each object in an image, and depth range refers to the perceived distance within the entire image. Several models were proposed to enhance depth perception based on monocular depth cues. However, those methods were limited in: modeling monocular depth cues separately and only considering one of depth volume perception or depth range perception.

SUMMARY

According to one aspect of the invention, there is provided a method for controlling an amount of perceptual three-dimensional elements for a display. The method includes: receiving an input image; receiving user information concerning a user; adjusting an amount of perceptual three-dimensional elements within the input image to obtain an adjusted input image based on depth information of the input image and the user information; and displaying the input image as adjusted on a display.

According to various embodiments, the method may further include any one of the following features or any technically-feasible combination of some or all of the features:

- the display is a two-dimensional display;
- the display is a three-dimensional display;
- the adjusting step includes determining at least one content controlling parameter and at least one user controlling parameter, and wherein the at least one user controlling parameter is determined based on the user information;
- the at least one content controlling parameter includes two content controlling parameters that are determined based on the depth information, and wherein the depth information pertains to at least two layers;
- the at least one content controlling parameter includes a first content controlling parameter that is continuous and that is determined based on the depth information;
- the input image is received without any associated depth information, and wherein the method further comprises determining the depth information of the input image based on analyzing an inherent perceptual depth of the input image;
- the user information includes user profile information, and wherein the user profile information includes information or data specifying or indicating a demographic of the user, a physical attribute of the user, and/or a determined behavior of the user;
- the user information specifies or indicates a perceptual three-dimensional (3D) control input received from the user;
- the adjusting step includes adjusting one or more monocular 3D perception cues, and wherein the one or more monocular 3D perception cues include a shading cue, a texture cue, a luminance contrast cue, and/or a motion parallax cue;
- the one or more monocular 3D perception cues include the motion parallax cue, and wherein the motion parallax cue is determined based on a location of the user;
- the amount of perceptual three-dimensional elements for display within the input image is determined based on a predetermined perceptual three-dimensional (3D) control input;
- the method is carried out by vehicle electronics of a vehicle;
- the predetermined perceptual 3D control input is set by a manufacturer or supplier of the vehicle;
- the adjusting step includes adjusting one or more shading and/or texture cues through tone mapping that is based on the user information;
- the adjusting one or more shading and/or texture cues includes retargeting the input image with a first tone mapping operator that is selected based on the user information;
- the first tone mapping operator is for base shading, wherein the adjusting one or more shading and/or texture cues further includes adjusting the input image with a second tone mapping operator that is selected based on the user information, and wherein the second tone mapping operator is for detail shading;
- the adjusting step includes adjusting albedo contrast based on the user information; and/or
- the adjusting albedo contrast includes retargeting the input image with a first tone mapping operator that is selected based on the user information.

According to another aspect of the invention, there is provided a method of controlling an amount of perceptual three-dimensional elements for a display. The method includes: receiving an input image; obtaining depth information of the input image receiving user information concerning a user; adjusting an amount of perceptual three-dimensional elements within the input image based on the user information and the depth information of the input image; and displaying the input image as adjusted on a display.

According to another aspect of the invention, there is provided an image processing system that includes at least one processor; and memory storing computer instructions that are accessible by the at least one processor. The at least one processor is configured to execute the computer instructions, and, when the at least one processor executes the computer instructions, the system: receives an input image; receives user information concerning a user; adjusts an amount of perceptual three-dimensional elements within the input image to obtain an adjusted input image based on depth information of the input image and the user information; and sends the adjusted input image to a display for display.

According to various embodiments, the image processing system may further include any one of the following features or any technically-feasible combination of some or all of the features:

the display is a two-dimensional display;
the display is a three-dimensional display;
the adjusting includes determining at least one content controlling parameter and at least one user controlling parameter, and wherein the at least one user controlling parameter is determined based on the user information;
the at least one content controlling parameter includes two content controlling parameters that are determined based on the depth information, and wherein the depth information pertains to at least two layers;
the at least one content controlling parameter includes a first content controlling parameter that is continuous and that is determined based on the depth information;
the input image is received without any associated depth information, and wherein, when the at least one processor executes the computer instructions, the system determines the depth information of the input image based on analyzing an inherent perceptual depth of the input image;
the user information includes user profile information, and wherein the user profile information includes information or data specifying or indicating a demographic of the user, a physical attribute of the user, and/or a determined behavior of the user;
the user information specifies or indicates a perceptual three-dimensional (3D) control input received from the user;
the adjusting includes adjusting one or more monocular 3D perception cues, and wherein the one or more monocular 3D perception cues include a shading cue, a texture cue, a luminance contrast cue, and/or a motion parallax cue;
the one or more monocular 3D perception cues include the motion parallax cue, and wherein the motion parallax cue is determined based on a location of the user;
the amount of perceptual three-dimensional elements for display within the input image is determined based on a predetermined perceptual three-dimensional (3D) control input;

the image processing system is comprised of vehicle electronics of a vehicle;
the predetermined perceptual 3D control input is set by a manufacturer or supplier of the vehicle;
the adjusting includes adjusting one or more shading and/or texture cues through tone mapping that is based on the user information;
the adjusting one or more shading and/or texture cues includes retargeting the input image with a first tone mapping operator that is selected based on the user information;
the first tone mapping operator is for base shading, wherein the adjusting one or more shading and/or texture cues further includes adjusting the input image with a second tone mapping operator that is selected based on the user information, and wherein the second tone mapping operator is for detail shading; and/or
the adjusting includes adjusting albedo contrast based on the user information; and/or the adjusting albedo contrast includes retargeting the input image with a first tone mapping operator that is selected based on the user information.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

Figure 1:
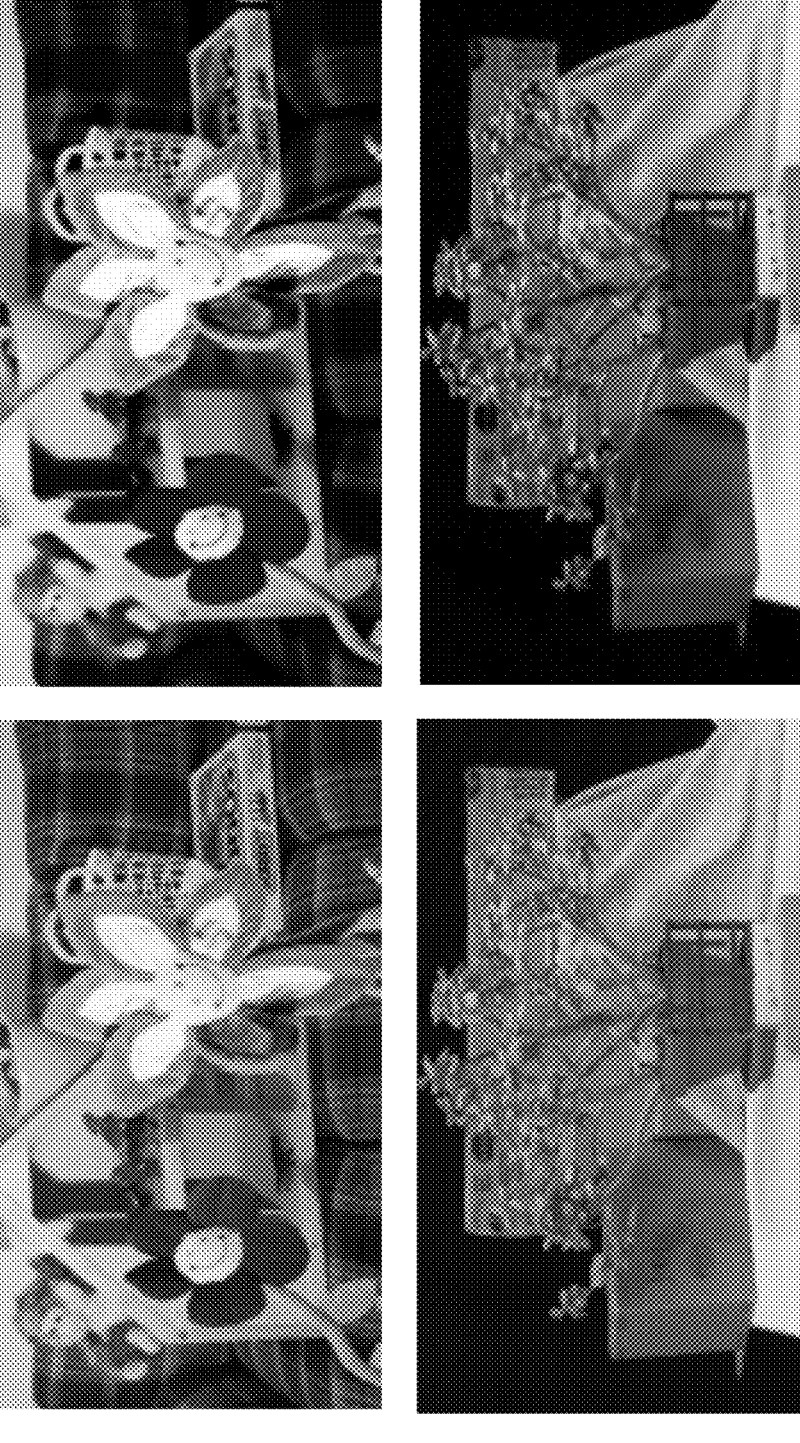
FIG. 1 is an example image used for a qualitative evaluation of the disclosed JSM framework.

The image processing system and method described herein enables enhancing monocular depth perception through a disclosed joint modeling of shading and contrast (JSM) framework (the "disclosed JSM framework"), which, according to various embodiments and implementations, may include improvements to depth volume perception and depth range perception. As discussed above, conventional methods used for improving monocular depth perception are limited to being only able to improve either depth volume perception or depth range perception, but not both simultaneously. However, the disclosed JSM framework, which is discussed below, enables improvements to both depth volume perception and depth range perception simultaneously. For example, an input image may be adjusted according to the disclosed JSM framework, which thereby improves depth volume perception of one or more objects and depth range perception of one or more of the same and/or other objects simultaneously. Moreover, according to at least some embodiments, the disclosed JSM framework provides for adjustable, controllable, and/or tunable (collectively, "controllable") depth perception so that the extent of the perceptible depth range and depth volume may be tuned to a particular user's desires and/or according to information about the user, such as demographic information of the user or a perceptual 3D control input for a user, as discussed below.

A three-dimensional display device enables perception of 3D based on binocular depth cues. Since the disclosed JSM framework enhances 3D perception based on monocular depth cues that is complimentary for binocular depth cues in enhancing 3D perception, it may be applied to enhance depth perception for both two-dimensional display devices and three-dimensional display devices.

The Disclosed JSM Framework. The disclosed JSM framework comprises a depth analysis module, a shading/contrast retargeting module, and a motion parallax module. The depth analysis module estimates the pixel-wise depth information to determine foreground and background. The shading/contrast retargeting and motion parallax modules are controlled according to the depth profiles obtained from the depth analysis module. That is, the amount of shading cue(s), contrast cue(s), and motion parallax are based on the depth profile information. For example, two types of depth profiles are implemented: two-layered depth (an example of multi-layered depth) and continuous depth.

The shading/contrast retargeting module jointly models the shading, local texture, and global contrast cue(s) and adjusts each element to enhance the depth perception. In the joint model, the shading and local texture cues contribute to increasing the depth volume perception, while the global contrast cue contributes to increasing the depth range perception. In the joint model, the luminance of an input color image $I_y$ is modeled by the multiplication of albedo $A_y$ and shading S, as follows:

$$I_y = A_Y \cdot S = A_y \cdot (S_B + S_D) \qquad \text{Equation 1}$$

where $S_B$ and $S_D$ represent the base layer and detail layer of shading. $A_y$ is computed by the guided filter-based albedo extraction algorithm, which is formulated as follows:

$$A_y = \langle A_{rgb} \rangle \qquad \text{Equation 2}$$

$$A_{rgb} = f_A(I_{rgb}) \qquad \text{Equation 3}$$

where $I_{rgb}$ is the input color image, and $f_A$ indicates the guided filter. The operation $\langle X \rangle$ indicates the selection of the luminance channel of X.

The base-shading information $S_B$ is retargeted with a non-linear tone-mapping operator to control the shading depth volume cue, which is formulated as follows:

$$S'_B = g_n(S_B) \qquad \text{Equation 4}$$

where $S'_B$ is the retargeted base-shading, and $g_n$ is a non-linear tone-mapping operator (here, the truncated power function is used). Then, the detail-shading information $S_D$ is enhanced with a linear boosting operator to control the shading depth volume cue, which is defined as follows:

$$S'_D = g_l(S_D) \qquad \text{Equation 5}$$

where $S'_D$ is the boosted detail-shading, and $g_l$ is a linear boosting operator.

Further, the depth range perception is increased by controlling the contrast cues in the entire image, where three types of contrast are adopted: albedo contrast, shading contrast, and texture contrast. Albedo contrast refers to the dynamic range within the entire image, which is increased to give a higher depth range perception. For example, in a two-layered image, shading and texture contrast respectively refer to the shading difference and the inclusion and/or clarity of details difference between foreground and background. As discussed below, the disclosed JSM framework is not limited to two-layered images, and may be applied to those having any number of layers and/or a continuous depth profile. Due to the aerial perspective, closer objects appear to be more shaded and with more textures while distant objects appear to be less shaded and more out of focus. In order to manipulate the shading contrast and texture contrast, in the disclosed JSM framework, base-shading and detail-shading may be emphasized for the closer objects while suppressing shading information for the far objects according to the depth profile. Besides, global luminance contrast (albedo contrast) is controlled in albedo image as follows:

$$A'_y = g_t(A_y) \qquad \text{Equation 6}$$

where $A'_y$ is the retargeted albedo image via the tone-mapping operator $g_t$.

The processed albedo, base-shading, and detail-shading are composed to obtain the depth perception enhanced luminance $I'_y$ as follows:

$$I'_y = A'_y \cdot (S'_B + S'_D) \qquad \text{Equation 7}$$

The shading/contrast retargeting module is followed by the motion parallax module that increases the depth range perception by providing moving objects according to their relative depth. For example, the closer objects are moving faster than the far objects. In the proposed framework, this movement may be implemented as being relative to the viewer's head movement.

Results. In order to evaluate the proposed framework, a qualitative evaluation, ablation study, and subjective user evaluation on the natural images and automotive cluster images were conducted. At least some of the images were collected from the public Middlebury (D. Schastein et al., "High-resolution stereo datasets with subpixel-accurate ground truth," GCPR, 2014) dataset. FIG. 1 shows images used for the qualitative evaluation, indicating that the proposed framework can enhance depth perception in terms of depth volume and range. The ablation study analyzed and proved the contribution of each element in the proposed framework. Table 1 shows subjective user evaluations of an image displayed on a 2D display without applying the disclosed JSM framework to adjust the image, an adjusted version of the image displayed on a 2D display after having applied the disclosed JSM framework to adjust the image, and the image displayed on a 3D display without applying the disclosed JSM framework to adjust the image but with an additional stereoscopic image pair. Higher values for depth perception and overall 3D experience are considered better and lower values for visual fatigue are considered better.

TABLE 1

|  | Depth Perception | Visual Fatigue | Overall 3D Experience |
| --- | --- | --- | --- |
| 2D Display | 2.3 | 0.5 | 2.0 |
| JSM on 2D Display | 5.5 | 1.0 | 6.0 |
| 3D Display | 8.2 | 8.5 | 6.7 |

Table 2 shows results of an ablation study of the disclosed JSM framework and, as shown in Table 2 and with reference to FIGS. 2-6, each element enhances the depth perception in terms of either depth volume or depth range. The character "v" in Table 2 indicates that the sub-module is enabled (a) base-shading, (b) detail-shading, (c) shading contrast, and (d) albedo contrast. That is, the left-most and right-most represent the original image and the result obtained through application of the disclosed JSM framework. According to some embodiments, the sub-modules (a)—(d) may be selectively enabled or selectively controlled according to user information.

TABLE 2

Figure 2:
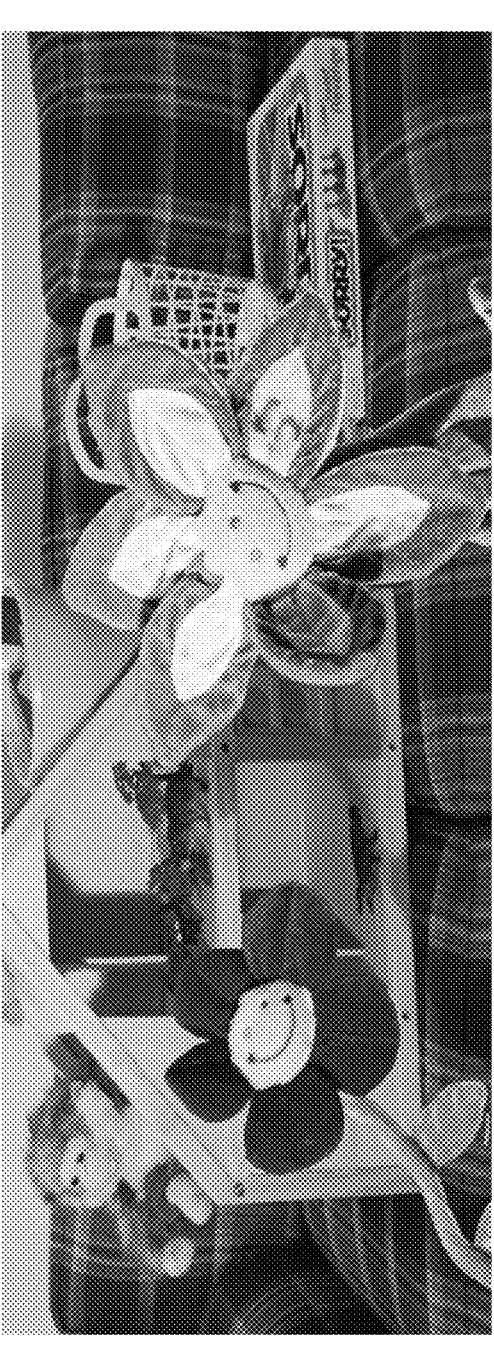
FIGS. 2-6 shows exemplary images as adjusted when corresponding modules are enabled as described below with respect to Table 2.
Figure 3:
Figure 4:
Figure 5:
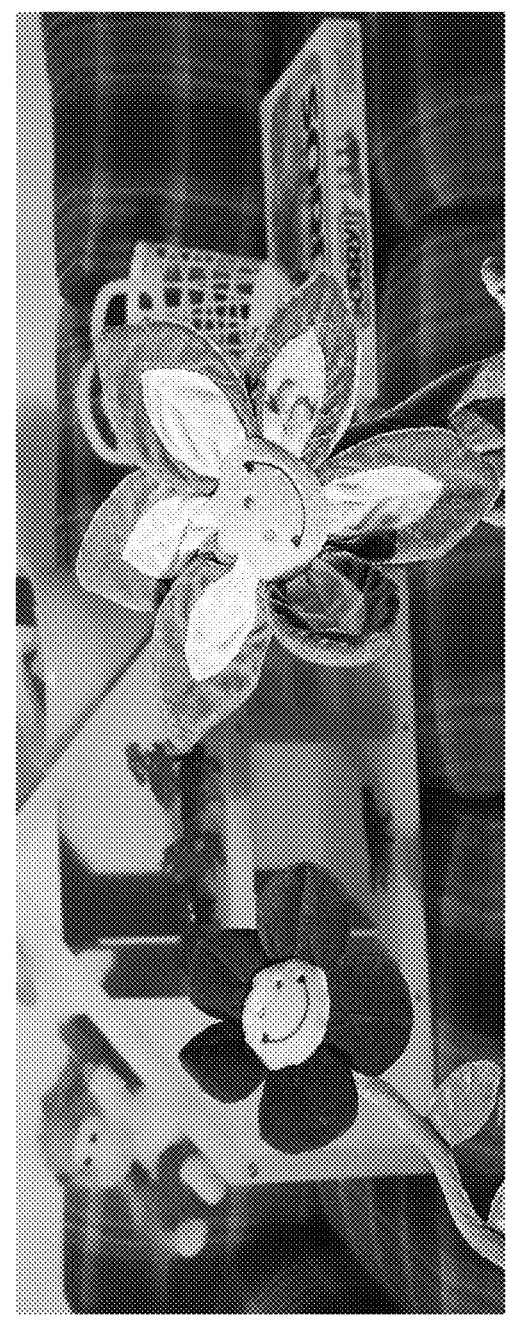
Figure 6:
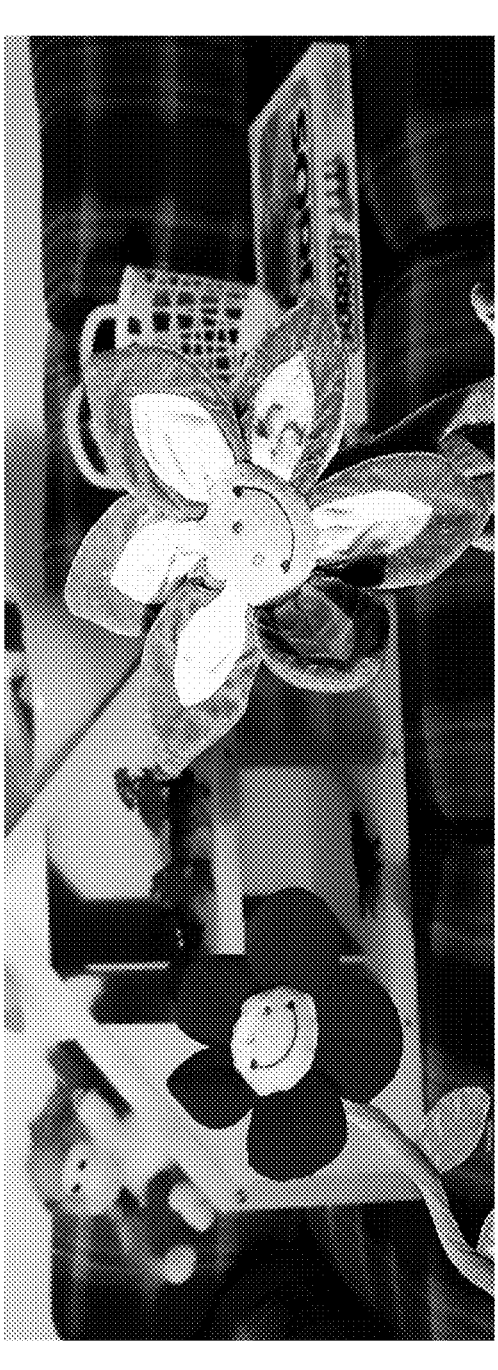

|  | FIG. 2 | FIG. 3 | FIG. 4 | FIG. 5 | FIG. 6 |
|---|---|---|---|---|---|
| (a) |  | v | v | v | v |
| (b) |  |  | v | v | v |
| (c) |  |  |  | v | v |
| (d) |  |  |  |  | v |

Further, subjective user evaluation was conducted to compare the proposed framework with the autostereoscopic 3D display (3D Global Solutions) and the 2D original image (Table 1). The depth perception, visual fatigue, and overall 3D experience were evaluated by 18 participants whose ages ranged from 20-50, and the evaluation scores were scaled into the range of 0-10. The evaluation results show that the proposed framework can achieve comparable depth perception and very low visual fatigue relative to that of the autostereoscopic 3D display.

Figure 7:
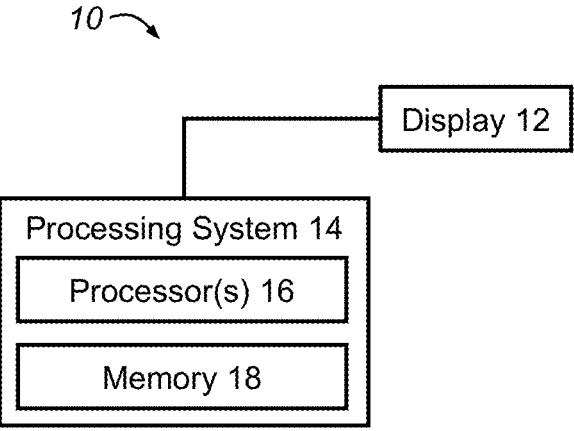
FIG. 7 shows an image processing system that is capable of carrying out one or more of the methods described herein, according to at least some embodiments.

With reference now to FIG. 7, there is shown an image processing system 10 (shown as a computer system) that includes an electronic display 12 and a processing system 14. The processing system 14 is shown in FIG. 7 as including at least one processor 16 and memory 18. It should be appreciated that any suitable number of processors and/or memories may be used and that such processors/memories may be co-located or remotely located. Moreover, in some embodiments, the electronic display 12 may be co-located with or remotely located from the processing system 14. In such embodiments, a suitable network connection may be used for transferring data between the processing system 14 and the electronic display 12, such as for sending the adjusted input image to the electronic display 12 for display, for example.

Figure 8:
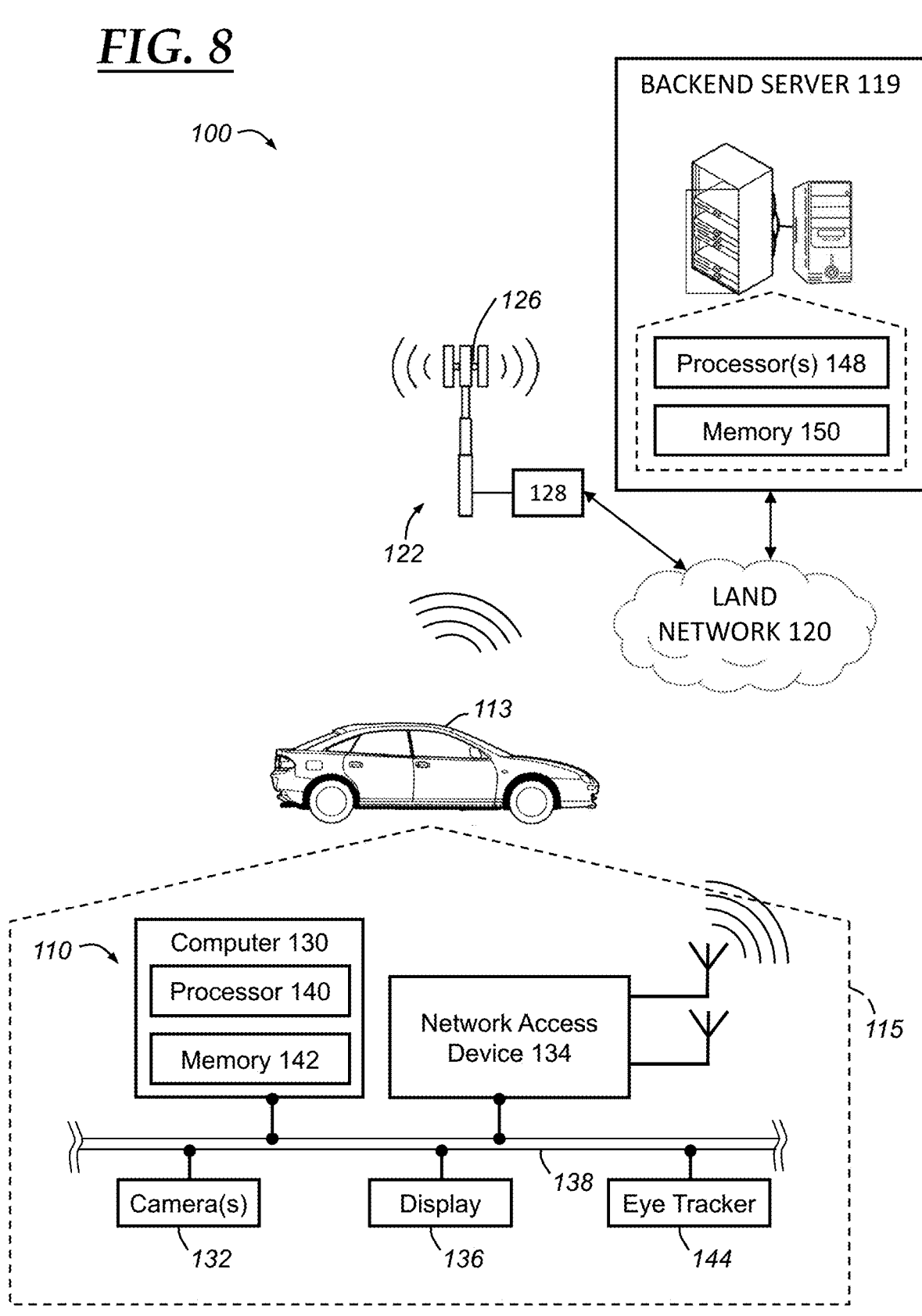
FIG. 8 is an operating environment that includes an image processing system that may be used to carry out one or more of the methods described herein.
Figure 10:
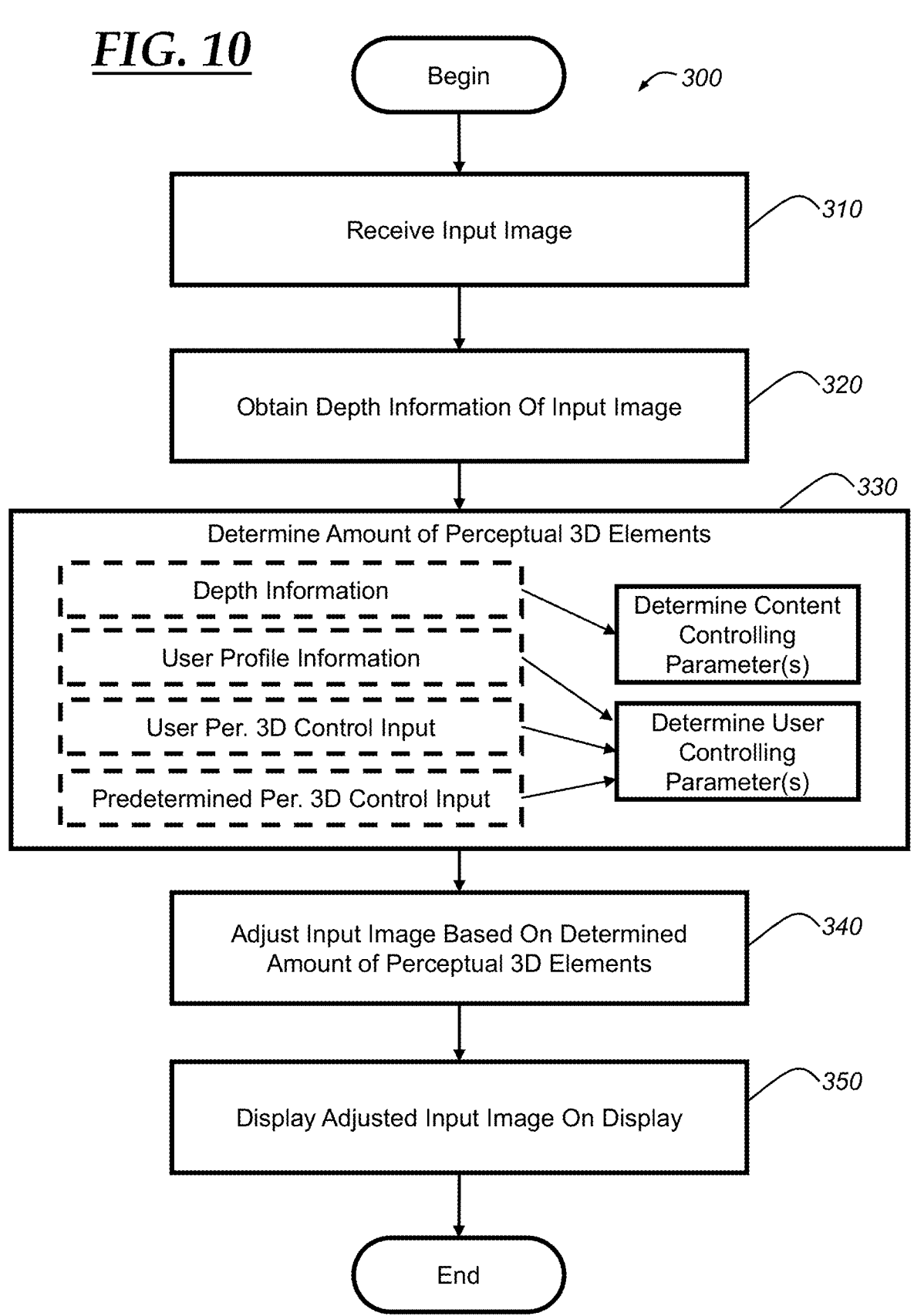
FIG. 10 shows a flowchart depicting a method of adjusting an input image based on a perceived appearance of the input image on a target display and on an ideal display, according to at least some embodiments.

With reference now to FIG. 8, there is shown an operating environment that comprises a communications system 100, a vehicle 113 having vehicle electronics 115 including an image processing system 110, one or more backend servers 119, a land network 120, and a wireless carrier system 122. The discussion of the image processing system 10 above is hereby attributed to the image processing system 110. According to at least some embodiments, the image processing system 110 is configured to carry out one or more of the methods described herein, such as method 300 (FIG. 10). It should be appreciated that while the image processing system 110 is discussed in the context of a vehicular application, the image processing system 110 may be used as a part of a variety of other applications or contexts, such as where the image processing system 110 is incorporated into a handheld mobile device (e.g., smartphone), a personal computer (e.g., laptop, desktop computer), or a cloud processing system.

The land network 120 and the wireless carrier system 122 provide an exemplary long-range communication connection between the vehicle 113 and the backend server(s) 119, for example. Either or both of the land network 120 and the wireless carrier system 122 may be used by the vehicle 113, the backend server(s) 119, or other components for long-range communications. The land network 20 may be a conventional land-based telecommunications network that is connected to one or more landline telephones and connects the wireless carrier system 122 to the backend server(s) 119. For example, the land network 120 may include a public switched telephone network (PSTN) such as that used to provide hardwired telephony, packet-switched data communications, and the Internet infrastructure. One or more segments of the land network 120 may be implemented through the use of a standard wired network, a fiber or other optical network, a cable network, power lines, other wireless networks such as wireless local area networks (WLANs), or networks providing broadband wireless access (BWA), or any combination thereof.

The wireless carrier system 122 may be any suitable long-range data transmission system, such as a cellular telephone system. The wireless carrier system 122 is shown as including a single cellular tower 126; however, the wireless carrier system 122 may include additional cellular towers as well as one or more of the following components, which may depend on the cellular technology being used: base transceiver stations, mobile switching centers, base station controllers, evolved nodes (e.g., eNodeBs), mobility management entities (MMEs), serving and PGN gateways, etc., as well as any other networking components used to connect the wireless carrier system 122 with the land network 120 or to connect the wireless carrier system 122 with user equipment (UEs, e.g., which may include telematics equipment in the vehicle 113), all of which is indicated generally at 128. The wireless carrier system 122 may implement any suitable communications technology, including for example GSM/GPRS technology, CDMA or CDMA2000 technology, LTE technology, 5G, etc. In at least one embodiment, the wireless carrier system 122 implements 5G cellular communication technology and includes suitable hardware and configuration. In some such embodiments, the wireless carrier system 122 provides a 5G network usable by the vehicle 113 for communicating with the backend server(s) 119 or other computer/device remotely located from the vehicle 113. In general, the wireless carrier system 122, its components, the arrangement of its components, the interaction between the components, etc. is generally known in the art.

The one or more backend servers (or backend server(s)) 119 may be used to provide backend processing for the image processing system 110, the vehicle 113, and/or other components of the system 100. In at least one embodiment, the backend server(s) 119 includes one or more computers or computing devices (collectively, "computer(s)") that are configured to carry out one or more steps of the methods described herein, such as the methods 300 (FIG. 10). In another embodiment, the backend server(s) 119 are used to store information concerning and/or pertaining to the vehicle 113 or the image processing system 110, such as predetermined graphics (or other images), predetermined tone curves that may be used as a part of a pixel compensation technique, user information concerning a user (e.g., user profile information), as discussed below. The backend server(s) 119 may be implemented or hosted by one or more computers, each of which includes a processor and a non-transitory, computer-readable memory that is accessible by the processor.

The vehicle 113 is depicted in the illustrated embodiment as a passenger car, but it should be appreciated that any other vehicle including motorcycles, trucks, sports utility vehicles (SUVs), recreational vehicles (RVs), bicycles, other vehicles or mobility devices that can be used on a roadway or sidewalk, etc., can also be used. As depicted in the illustrated embodiment, the vehicle 113 includes the vehicle electronics 115, which include an onboard vehicle computer 130, one or more cameras 132, a network access device 134, an electronic display (or "display") 136, a vehicle communications bus 138, and an eye tracker 144. FIG. 8 provides an example of certain components of the vehicle electronics 115, however, it should be appreciated that, according to various embodiments, the vehicle electronics 115 may include one or more other components in addition to or in lieu of those components depicted in FIG. 8.

The one or more cameras 132 are each used to obtain image data of the vehicle's environment, and the image data, which represents an image captured by the camera(s) 132, may be represented as an array of pixels that specify color information. The camera(s) 132 may each be any suitable digital camera or image sensor, such as a complementary metal-oxide-semiconductor (CMOS) camera/sensor. The camera(s) 132 are each connected to the vehicle communications bus 138 and may provide image data to the onboard vehicle computer 130, which may be received as a an input image at the image processing system 110. In some embodiments, image data from one or more of the camera(s) 132 is provided to the backend server(s) 119. The camera(s) 132 may be mounted so as to view various portions within or surrounding the vehicle.

The network access device 134 is used by the vehicle 113 to access network(s) that are external to the vehicle 113, such as a home Wi-Fi™ network of a vehicle operator or one or more networks of the backend server(s) 119. The network access device 134 includes a short-range wireless communications (SRWC) circuit (not shown) and a cellular chipset (not shown) that are used for wireless communications. The SRWC circuit includes an antenna and is configured to carry out one or more SRWC technologies, such as any one or more of the IEEE 802.11 protocols (e.g., IEEE 802.11p, Wi-Fi™), WiMAX™, ZigBee™, Z-Wave™, Wi-Fi direct™, Bluetooth™ (e.g., Bluetooth™ Low Energy (BLE)), and/or near field communication (NFC). The cellular chipset includes an antenna and is used for carrying out cellular communications or long-range radio communications with the wireless carrier system 122.

The display 136 is an electronic display that is used to display graphics or images, and may be, for example, an LCD or an OLED display. According to some embodiments, the display 136 is the display of the method 300 (FIG. 10).

The eye tracker 144 is an eye-tracking device that includes an eye tracker sensor and associated circuitry for tracking an eye of a passenger, such as a driver, of the vehicle 113. In one embodiment, the eye tracker sensor is an active sensor that transmits electromagnetic waves (e.g., infrared or near-infrared (between visible and infrared) light) that is reflected off the passenger's eye and received as a sensor response at the eye tracker sensor. A location of the eye may be determined based on the sensor response and this may be used as (or used to derive or otherwise determine) a location of a viewer/passenger. The sensor information and/or eye location information may be sent to the onboard vehicle controller 130.

The onboard vehicle computer 130 is an onboard computer in that it is carried by the vehicle 113 and is considered a vehicle computer since it is a part of the vehicle electronics 115. The onboard vehicle computer 130 includes at least one processor 140 and non-transitory, computer-readable memory 142 that is accessible by the at least one processor 140. The onboard vehicle computer 130 may be used for various processing that is carried out at the vehicle 113 and, in at least one embodiment, forms at least a part of the image processing system 110 and is used to carry out one or more steps of one or more of the methods described herein, such as the method 300 (FIG. 10). The onboard vehicle computer 130 is connected to the vehicle communications bus 138 and may send messages to, and receive messages from, other vehicle components using this bus 138. The onboard vehicle computer 130 may be communicatively coupled to the network access device 134 so that data may be communicated between the onboard vehicle computer 130 and a remote network, such as the backend server(s) 119.

The image processing system 110 is used to carry out at least part of the one or more methods discussed herein, such as the method 300 (FIG. 10). As shown in the illustrated embodiment, the image processing system 110 is implemented by one or more processors and memory of the vehicle 113, which may be or include the at least one processor 140 and memory 142 of the onboard vehicle computer 130. In some embodiments, the image processing system 110 may additionally include the display 136. In one embodiment, at least one of the one or more processors carried by the vehicle 113 that forms a part of the image processing system 110 is a graphics processing unit (GPU). The memory 142 stores computer instructions that, when executed by the at least one processor 140, cause one or more of the methods (or at least one or more steps thereof), such as the method 300 (FIG. 10) discussed below, to be carried out.

The backend server(s) 119 are shown as including one or more processors 148 and non-transitory, computer-readable memory 150. In one embodiment, the backend server(s) 119 are used to carry out one or more steps of one or more methods described herein, such as the methods 300 (FIG. 10) discussed below. In such embodiments, the backend server(s) 119 may be configured so that, when computer instructions stored on the memory 150 are executed by the processor(s) 148, the backend server(s) 119 causes certain steps and/or functionality to be carried out, such as any of the functionality attributed to the backend server(s) 119 as discussed herein. In one embodiment, the processor(s) 148 and the memory 150 storing the computer instructions may form an image processing system that is configured to carry out one or more steps of one or more methods described below. In one embodiment, the image processing system 110 includes portions (e.g., the processor(s) 148 and/or the memory 150) of the backend server(s) 119. For example, in such an embodiment, steps 310-340 of the method 300 (FIG. 10) may be carried out by the backend server(s) 119 and step 350 may be carried out by the vehicle 113 using the electronic display 136.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers discussed herein may include other memory, such as volatile RAM that is used by the processor, and/or multiple processors.

Figure 9:
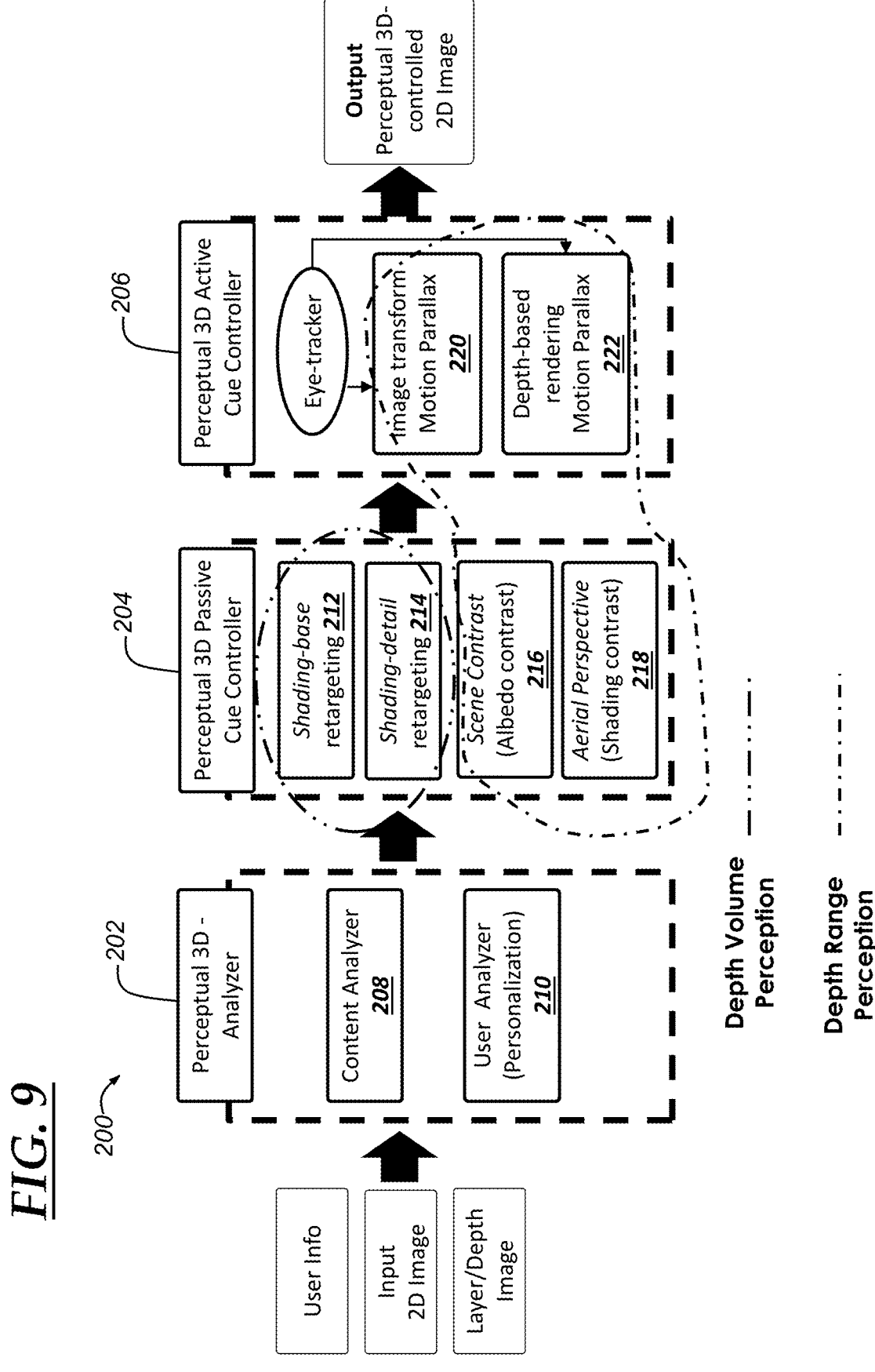
FIG. 9 is a diagrammatic depiction of modules that may be used as a part of an image processing system, such as the image processing systems of FIGS. 7-8.

With reference to FIG. 9, there is shown a diagrammatic depiction of modules that may be used as a part of an image processing system, such as the image processing systems 10, 110 described above, and that form a controllable perceptual three-dimensional (3D) system 200 that includes a perceptual three-dimensional (3D) analyzer 202, a perceptual 3D passive cue controller 204, and a perceptual 3D active cue controller 206. In some embodiments, the perceptual 3D active cue controller 206 is omitted from the controllable perceptual 3D system 200. The image processing system 10, 110 may be used to implement the controllable perceptual 3D system 200, at least according to some embodiments.

Each of the perceptual 3D analyzer 202, the perceptual 3D passive cue controller 204, and the perceptual 3D active cue controller 206 may be implemented as software modules and represented as computer instructions that, when executed by the processor(s) of the image processing system, cause the attributed functionality to be carried out, such as described below. The disclosed JSM framework discussed herein may be used to implement the perceptual 3D analyzer 202, the perceptual 3D passive cue controller 204, the perceptual 3D active cue controller 206, and/or portions thereof.

The perceptual 3D analyzer 202 includes a content analyzer 208 and a user analyzer 210 that are used to determine controlling parameters c and u. The content analyzer 208 takes an input image type as input and outputs content controlling parameter(s) c. Examples of the input image type include input image format and input image content. The input image format refers to whether the image is a two-layered image, a multi-layered image (other than a two-layered image), a color and depth image, or only a color image (having no layers or depth information). For example, for two-layered images, two discrete constant parameters $c_1$ and $c_2$ may be used as content controlling parameters, which are spatially invariant in the entire image. For color and depth images, controlling parameter c can be a continuous value parameter, which is spatially variant and determined based on the pixel-wise depth information. The input image content refers to information relating to the content of the image and may include categorizing the image and/or its content, such as by whether it is natural/synthetic, daily-life/automotive-cluster, and human/nature. The inherent perceptual-depth (IPD) of the input image is analyzed as described below. According to the analyzed IPD, the controlling parameter can be adjusted to enhance more depth perception for images with low IPD while less depth perception for images with high IPD.

The content controlling parameter may be used to adjust the amount of 'shading-base retargeting', 'shading-detail retargeting', 'scene contrast', and 'aerial perspective'. Specifically, the content controlling parameter may be used to control (i) the shape of the tone-mapping operator $g_t$, the non-linear tone-mapping operator $g_n$, and the linear boosting operator $g_i$; and (ii) the sensitivity of motion parallax. For example, for $g_n$ in Equation (4), where a truncated power function is used as the non-linear tone mapping operator, the parameter for the power function and threshold for the truncation may be determined based on the controlling parameter c. And, as another example, for $g_i$ in Equation (5), where a polynomial function is used as the linear boosting operator, the coefficients of the polynomial function may be determined based on the controlling parameter c. The content controlling parameter may be determined based on depth and/or color information of the input image. In one embodiment, color and depth information of an image is inputted. In a two layer mode, two content controlling parameters $c_1$ and $c_2$ are determined for the two layers, which may be a foreground and background layer. In a continuous depth mode, the content controlling parameter cd is pixelwise determined according to the depth information. In another embodiment, such as where depth information is not inputted or received, the inherent perceptual-depth (IPD) of the input image is analyzed to determine depth information of the input image using, for example, a monocular depth estimation technique. The IPD may differ depending on the characteristics of the image. Examples of such characteristics may include natural/synthetic, daily-life/automotive-cluster, human/nature, etc. The content controlling parameter(s) may be determined according to the analyzed IPD (or the determined depth information) in such an embodiment.

The user analyzer 210 takes user information, such as user profile information and/or a perceptual 3D control input for a user, as input and outputs a user controlling parameter u. The user information may include user profile information concerning the user, such as the user's age, or settings of the user, such as preferred illumination settings or calibration information. Additionally or alternatively, the user information may include a perceptual 3D control input for the user, which may indicate an amount of perceptual 3D elements, as discussed below. The user controlling parameter may be used to adjust the amount of 'shading-base retargeting', 'shading-detail retargeting', 'scene contrast', and 'aerial perspective'. Specifically, the user controlling parameter may be used to control (1) the shape of the tone-mapping operator $g_t$, the non-linear tone-mapping operator $g_n$, and the linear boosting operator $g_i$; and (ii) the sensitivity of motion parallax. The user controlling parameter may be determined via the following possible scenarios: (a) user information (which may indicate or represent a depth perception sensitivity for the user) is profiled to adjust the amount of target depth perception; (b) a user manually controls the target depth perception (which may be according to the user's personal preference or desire) via a user interface (UI) (e.g., slide bar or number inputs on a touchscreen display, such as the display 136 of the vehicle 113) by providing a perceptual 3D control input, which specifies or indicates the target depth perception, to the input processing system; and (c) a target depth perception for a user or a group of users may be pre-set, such as by an OEM or other manufacturer, supplier, or seller, according to the application in which it is used, and then provided to the image processing system as a perceptual 3D control input. In some embodiments, the pre-set target depth perception for the user may be set based on user information concerning the user, such as the user's age.

The perceptual 3D passive cue controller 204 is used to carry out processing related to passive 3D perceptual cues. Such processing includes shading-base retargeting module 212, shading-detail retargeting module 214, scene contrast (albedo contrast) adjustment module 216, and aerial perspective (shading contrast) adjustment module 218. The shading-base retargeting module 212 and the shading-detail retargeting module 214 are used to improve depth volume perception. The scene contrast (albedo contrast) adjustment module 216 and the aerial perspective (shading contrast) adjustment module 218 are used to improve depth range perception.

The shading-base retargeting module 212 includes retargeting base-shading information $S_B$ with a non-linear tone-mapping operator $g_n$ to control the shading depth volume cue, which is formulated as described above in Equation 4.

The shading-detail retargeting module 214 includes enhancing the detail-shading information $S_D$, with a linear boosting operator $g_l$ to control the shading depth volume cue, which is defined above in Equation 5.

The scene contrast (albedo contrast) adjustment module 216 includes retargeting an albedo image via the tone-mapping operator $g_r$, which is discussed above with respect to Equation 6. The albedo image may be derived from the inputted image. The albedo contrast may be increased by the scene contrast (albedo contrast) adjustment module 216 to give a higher depth range perception.

The aerial perspective (shading contrast) adjustment module 218 includes adaptively retargeting a shading image via the spatially variant non-linear tone mapping operator $g_n$ and the linear boosting operator $g_l$, which are determined based on the depth information of each pixel. The aerial perspective contrast (shading contrast) may be increased by the aerial perspective adjustment module 218 to give a higher depth range perception.

The perceptual 3D active cue controller 206 is used to carry out processing related to active 3D perceptual cues. Such processing includes image transform motion parallax processing module 220 and depth-based rendering motion parallax processing module 222, and this processing may be used to improve depth range perception. In some embodiments, no active 3D perceptual cue processing is carried out and the perceptual 3D active cue controller 206 may be omitted. In one embodiment, the perceptual 3D active cue controller 206 uses input from a sensor that tracks the viewer, such as the eye tracker 144 of the vehicle 113 that tracks the eyes of a user (e.g., driver or another passenger of an automobile).

The content controlling parameter(s) and the user controlling parameter(s) may be used to control, adjust, or select a particular predetermined operator as the tone-mapping operator $g_r$, the non-linear tone-mapping operator $g_n$, and/or the linear boosting operator $g_l$. These operators $g_r$, $g_n$, $g_l$ are then used to adjust the input image. Accordingly, the user controlling parameter(s) may be used to inform the adjustment process of the input image so that the input image is adjusted according to the user information.

With reference to FIG. 10, there is shown an embodiment of a method 300 for controlling an amount of perceptual three-dimensional elements for a display. According to at least some embodiments, the method 300 is used to generate an adjusted input image that is then displayed on a display, such as the in-vehicle display 136 of the vehicle 113. In one embodiment, the method 300 is carried out by an onboard controller of a vehicle, such as the onboard vehicle controller 130 of the vehicle 113.

The method 300 begins with step 310, wherein an input image is received. The input image may be represented as an electronic data file that is stored in memory of the vehicle 113, such as in the memory 142 of the onboard vehicle controller 130 of the vehicle 113. For example, the input image may be an sRGB image, such as a two-dimensional sRGB image. In some embodiments, the input image may be or include pre-stored graphics, images, or a combination thereof. In another embodiment, the input image may be or include an image (or portions thereof) obtained from a camera of the vehicle 113, such as one of the camera(s) 132 of the vehicle 113. In some embodiments, the input image may be a combination of one or more predetermined graphics or images (collectively, predetermined image(s)) and one or more images captured from the camera 132 that are streamed to the display as they are captured (subject to processing the input image using the present method and/or other processing so that, in such embodiments, adjusting input images are streamed to the display). In some embodiments, the input image is received at the onboard vehicle controller 130 of the vehicle 113. In one embodiment, a portion of the input image or the whole input image may be sent from the backend server(s) 119 to the vehicle 113 and received at the onboard vehicle controller 130. In some embodiments, various image processing may be carried out on the input image prior to the input image being received at step 310. The method 300 continues to step 320.

In step 320, depth information of the input image is obtained. In one embodiment, the depth information is received at the image processing system—for example, the depth information may be received simultaneously with the input image. In another embodiment, the depth information may be determined based on analyzing the contents of (or an inherent perceptual depth of) the input image, such as through extracting depth information from the color information of the input image, which may be carried out through one or more monocular depth estimation techniques that, for example, may be suitable when the input image is a two-dimensional image (e.g., a 2D sRGB image). In some embodiments, the depth information specifies information concerning two or more layers, including a foreground layer and a background layer, and this may be referred to as a multi-layer mode. In another embodiment, the depth information specifies pixel-wise depth information in a continuous depth mode. The method 300 continues to step 330.

In step 330, an amount of perceptual three-dimensional (3D) elements is determined. As used herein, an "amount of perceptual 3D elements" for an image means a quantity or extent of 3D visual cues that are or are to be included in the image. The amount of perceptual 3D elements that are determined in step 330 are determined according to a target 3D experience, which may be customizable or tunable for a particular user, based on a control input, and/or based on contents of the input image as may be determined by the content analyzer 208 as discussed above. The amount of perceptual 3D elements may be represented by the image processing system in a variety of ways. For example, the amount of perceptual 3D elements may include a numerical value that represents an extent or quantity of 3D visual cue(s), such as the amount of contrast/shading. In such an example, an amount of shading may increase 3D perception of an object or area within an image and the amount of perceptual 3D elements may correspond to the amount of shading. Of course, this is but one example. In one embodiment, the amount of perceptual 3D elements may be represented or characterized according to one or more properties of the input image that are able to affect the monocular 3D experience, such as an extent to which an object appears to be three-dimensional.

In at least one embodiment, the amount of perceptual 3D elements is determined based on user information concerning a user. In some embodiments, this step includes determining at least one user controlling parameter and/or at least one content controlling parameter. As described above, the user controlling parameter may be used to control attributes of the disclosed JSM framework, which may be used to adjust the input image (step 340). The at least one user controlling parameter includes a user controlling parameter that is determined based on user information, which may include user profile information and/or a perceptual three-dimensional (3D) control input received from the user or configured for the user (e.g., pre-set by an OEM of the vehicle 113), which may be tailored to the specific user or tailored to a group in which the user is a member (e.g., age group). The user profile information may include demographic information (e.g., age, sex, general location), driving profile information (i.e., information pertaining to or derived from sensor data indicating a past driving experience of the user, such as where it may indicate a depth perception sensitivity (e.g., as derived or estimated based on a detected latency or delay of the user's reaction to actuating a manual brake of the vehicle)), behavioral information, settings or other inputs received by the user as a part of a user profile (e.g., settings or preferences input into the vehicle 113 by the user, an eye prescription strength (or other physical attribute) input by the user, preferred illumination settings, display calibration information), and/or other like user-related information that may be used to provide a profile of the user, such as for purposes of estimating or otherwise determining a depth perception sensitivity or other visual perceptual sensitivity or condition relevant to the user's 3D perception.

As mentioned above, the user information may include a perceptual 3D control input, which is data or information representing an indication of an amount of perceptual 3D elements for the input image as adjusted (step 340). The perceptual 3D control input may be received at the vehicle 113 from the user, such as through the user using a human-machine interface (e.g., a touchscreen and/or a microphone (coupled with speech recognition software) of the vehicle 113). For example, the display 136 may be a touchscreen that permits the user to slide a slider between a minimum and maximum value so that the current value of the slider indicates the amount of perceptual 3D elements to be displayed. A variety of other human-machine interfaces may be used to receive the perceptual 3D control input from the user.

In one embodiment, the at least one user controlling parameter includes a user controlling parameter that is determined based on a predetermined perceptual 3D control input. As mentioned above, the predetermined perceptual 3D control input specifies or indicates (collectively, "indicates") an amount of perceptual 3D elements, and this amount may be pre-stored in the memory of the image processing system (e.g., in memory 142 of the controller 130 of the vehicle 113) or remotely, such as at the backend server 119. In one embodiment, the predetermined perceptual 3D control input may be specified by a user and saved as a part of a user profile or user settings that are stored at the vehicle 113 and/or as part of a larger vehicle data network. In another embodiment, a vehicle manufacturer, which may be an original equipment manufacturer (OEM) of the vehicle or other vehicle manufacturing entity or vehicle service provider (such as another manufacturer or supplier (e.g., first tier supplier, vehicle data system provider)), may pre-set or determine the predetermined perceptual 3D control input. In at least some embodiments, the predetermined perceptual 3D control input is pre-set based on user profile information and, in such embodiments, since the predetermined perceptual 3D control input embodies or is derived from the user profile information, then determining a user controlling parameter based on the predetermined perceptual 3D control input also results in determining the user controlling parameter based on the user profile information. The predetermined perceptual 3D control input, or other value or input indicating an amount of perceptual 3D elements to be displayed, may be represented in a variety of ways, such as through discrete values (e.g., HIGH MEDIUM LOW) or continuous values (e.g., a value of 4.37), for example.

In at least some embodiments, in addition to determining at least one user controlling parameter, this step includes determining at least one content controlling parameter. In one embodiment, the at least one content controlling parameter includes two content controlling parameters that are determined based on the depth information, which pertains to at least two layers. This may be used when the depth information specifies information concerning two or more layers in a multi-layer mode, which may be a two-layer mode that includes a foreground layer and a background layer, or a three-layer mode that includes a foreground layer, a middle-ground layer, and a background layer. In such embodiments, a single content controlling parameter may be determined for each layer. In some embodiments, the at least one content controlling parameter includes a first content controlling parameter that is continuous and that is determined based on the depth information. This may be used when the depth information specifies pixel-wise depth information in a continuous depth mode. As described above, the content controlling parameter may be used to control attributes of the disclosed JSM framework. The method 300 continues to step 340.

In step 340, an amount of perceptual three-dimensional elements within the input image is adjusted to obtain an adjusted input image based on the user information and the depth information of the input image. In this step, according to at least one embodiment, the disclosed JSM framework is applied based on the at least one content controlling parameter and the at least one user controlling parameter. For example, the shape of the tone-mapping operator $g_t$, the non-linear tone-mapping operator $g_n$, and the linear boosting operator $g_l$ are set based on the at least one content controlling parameter and the at least one user controlling parameter. In some embodiments, this step includes adjusting one or more shading and/or texture cues through tone mapping, such as through use of those tone-mapping operators discussed above. Other operators, such as the linear boosting operator $g_l$, may be used to adjust the input image using the disclosed JSM framework. Applying or using the tone mapping and/or other operators to adjust the input image may be carried out in any suitable order. The method 300 continues to step 350.

In step 350, the adjusted input image is displayed on the display. The adjusted input image is sent to the display for being displayed, such as for viewing by the user. The display may be the display 136 of the vehicle 113, for example. In such an example, the adjusted input image may be sent from the onboard vehicle controller 130 to the display 136 via the communications bus 138 (or directly from the controller 130 to the display 136 where a suitable direct connection exists). The method 300 then ends.

In other embodiments, the method 300 as well as the image processing system described above may be used in non-vehicular applications, such as for image processing of images on a handheld mobile device, such as a smartphone, on a personal computer, such as a laptop or desktop computer, or on a cloud processing system, such as using the backend server(s) 119 to perform the method 300 (or at least steps 310-340). In such embodiments where a handheld mobile device is used, the handheld mobile device may include the image processing system 10 or a portion thereof, such as where part of the method 300 is performed using a backend or remote server. In such embodiments, the adjusted input image may be sent using a suitable long-range communication network to the handheld mobile device. The adjusted input image may then be sent to an electronic display of the handheld device and then displayed on the electronic display.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method for controlling an amount of perceptual three-dimensional elements for a display, wherein the method comprises:

receiving an input image;

receiving user information for a user, wherein the user information includes one or both of: predetermined data specifying a target depth perception preference for the user and predetermined user profile data for the user, wherein the user information specifies or indicates a perceptual 3D control input received from the user, and wherein the perceptual 3D control input is or indicates the predetermined data specifying the target depth perception preference for the user;

adjusting an amount of perceptual three-dimensional elements, including one or more monocular 3D perception cues, within the input image to obtain an adjusted input image based on depth information of the input image and the user information, wherein the one or more monocular 3D perception cues includes a shading cue, a texture cue, a luminance contrast cue, and/or a motion parallax cue, and wherein the user information is used for determining an adjustment to the one or more monocular 3D perception cues; and displaying the input image as adjusted on a display.

2. The method of claim 1, wherein the display is a two-dimensional display.

3. The method of claim 1, wherein the display is a three-dimensional display.

4. The method of claim 1, wherein the adjusting step includes determining at least one content controlling parameter and at least one user controlling parameter, and wherein the at least one user controlling parameter is determined based on the user information and used to control the amount of perceptual three-dimensional elements within the input image in order to obtain the adjusted input image.

5. The method of claim 4, wherein the at least one content controlling parameter includes two content controlling parameters that are determined based on the depth information, and wherein the depth information pertains to at least two layers.

6. The method of claim 4, wherein the at least one content controlling parameter includes a first content controlling parameter that is continuous and that is determined based on the depth information.

7. The method of claim 1, wherein the input image is received without any associated depth information, and wherein the method further comprises determining the depth information of the input image based on analyzing an inherent perceptual depth of the input image.

8. The method of claim 1, wherein the user information includes the predetermined user profile data, and wherein the predetermined user profile data includes information or data specifying or indicating a demographic of the user, a physical attribute of the user, and/or a determined behavior of the user.

9. The method of claim 1, wherein the one or more monocular 3D perception cues include the motion parallax cue, and wherein the motion parallax cue is determined based on a location of the user.

10. The method of claim 1, wherein the method is carried out by vehicle electronics of a vehicle.

11. The method of claim 10, wherein the predetermined perceptual 3D control input is set by a manufacturer or supplier of the vehicle.

12. The method of claim 1, wherein the adjusting step includes adjusting the shading cue and/or texture cue through tone mapping that is based on the user information.

13. The method of claim 12, wherein the adjusting the shading cue and/or texture cue includes retargeting the input image with a first tone mapping operator that is selected based on the user information.

14. The method of claim 13, wherein the first tone mapping operator is for base shading, wherein the adjusting one or more shading and/or texture cues further includes adjusting the input image with a second tone mapping operator that is selected based on the user information, and wherein the second tone mapping operator is for detail shading.

15. The method of claim 1, wherein the adjusting step includes adjusting albedo contrast by retargeting the input image with a first tone mapping operator that is selected based on the user information.

16. The method of claim 1, wherein the shading cue, the texture cue, and the contrast cue are modeled jointly and used for retargeting the perceptual three-dimensional elements with a tone-mapping operator determined based on the user information.

17. The method of claim 1, wherein the amount of perceptual three-dimensional elements is adjusted through joint manipulation of shading, texture, and contrast in accordance with the user information and the depth information.

* * * * *